UNITED STATES PATENT OFFICE.

GEORGE J. POPPLEIN, OF BALTIMORE, MD., ASSIGNOR TO THE POPPLEIN SILICATED PHOSPHATE FERTILIZER COMPANY, OF SAME PLACE.

IMPROVEMENT IN FERTILIZERS.

Specification forming part of Letters Patent No. 174,568, dated March 7, 1876; Reissue No. 8,187, dated April 16, 1878; application filed March 21, 1878.

*To all whom it may concern:*

Be it known that I, GEORGE J. POPPLEIN, of the city of Baltimore, State of Maryland, have invented certain new and useful Improvements in Fertilizers; and I hereby declare the following to be a full, clear, and exact description of the same.

This invention relates to compositions for restoring to the soil the substances which constitute plant-food, and which have been eliminated therefrom by previous cropping, or which are naturally absent or deficient in quantity.

Prominent among the substances assimilated in greater or less degree by nearly every form of vegetable growth are silica and potash.

Prior to my invention set forth in reissued Letters Patent No. 7,296, dated September 5, 1876, being a reissue of Letters Patent No. 149,244, granted to me March 31, 1874, no form of silica was known practically assimilable as plant-food.

I discovered that diatomaceous earth or tripoli, being derived from the remains of minute organisms of vegetable origin, is in a condition to be readily taken up by the spongioles of plants; and my present invention consists in a combination therewith of an alkaline salt, in all ordinary cases one of the well-known commercial salts of potash being used.

In combining the ingredients, the tripoli is finely comminuted by grinding, and thoroughly mixed with the alkaline salt—potash, in one of its ordinary commercial forms, such as carbonate, chloride, sulphate, (kainit,) being chosen, the latter also finely ground or pulverized.

An especial advantage arises from grinding and mixing the ingredients at the same time and together, as the enormous absorbent power of the tripoli tends to abstract any moisture from the alkali and greatly facilitates the processes of grinding and mixing. The same property of the tripoli also greatly facilitates the distribution of the fertilizer by means of drills and similar machines, as it is kept dry and in a condition to feed freely through the machine or distributer.

It is obviously impossible to prescribe a proportion of ingredients which will be applicable to all crops; but the necessary information may be readily obtained from any elementary work on agriculture in which the analysis of the ash of the various crops are given.

The tripoli and potash should be applied to the soil in the proportions shown to be taken up by the particular crop which is to be raised, and added in an amount governed by the natural condition of the soil.

In all ordinary cases the composition described, consisting simply of tripoli and potash, will be found to answer every requisite; but should it be deemed desirable, other ordinary alkaline salts—say, of soda or ammonia—may be substituted or added.

It may not be amiss to prescribe here the proportions of ingredients generally employed for various crops, the proportion of potash being calculated from the salt used to the formula KOH:

| | Tripoli. | Potash. |
|---|---|---|
| In wheat | 144 | 36 |
| In corn | 84 | 75 |
| In rye | 98 | 33 |
| In oats | 48 | 14 |
| In barley | 76 | 32 |
| In potatoes | 43 | 179 |
| In clover | 18 | 80 |
| In turnips | 55 | 140 |
| In carrots | 60 | 134 |
| In tobacco | 23 | 73 |

The above proportions are obviously merely approximate, and would be modified by the natural condition of the soil upon which the fertilizer is to be used. In a soil, for instance, naturally rich in potash and deficient in silica, a smaller proportion of the alkali would be used, and vice versa.

Having thus described my invention, what I claim as new, and desire to secure by Letters Patent, is—

1. A fertilizing composition containing tripoli and an alkaline salt, substantially as described.

2. A fertilizing composition containing tripoli and a salt of potash, substantially as described.

GEORGE J. POPPLEIN.

Witnesses:
R. D. WILLIAMS,
JNO. T. MADDOX.